(No Model.)  2 Sheets—Sheet 1.
M. T. WESTON & G. H. MARSTON.
SPLINT CUTTING MACHINE.
No. 574,050. Patented Dec. 29, 1896.
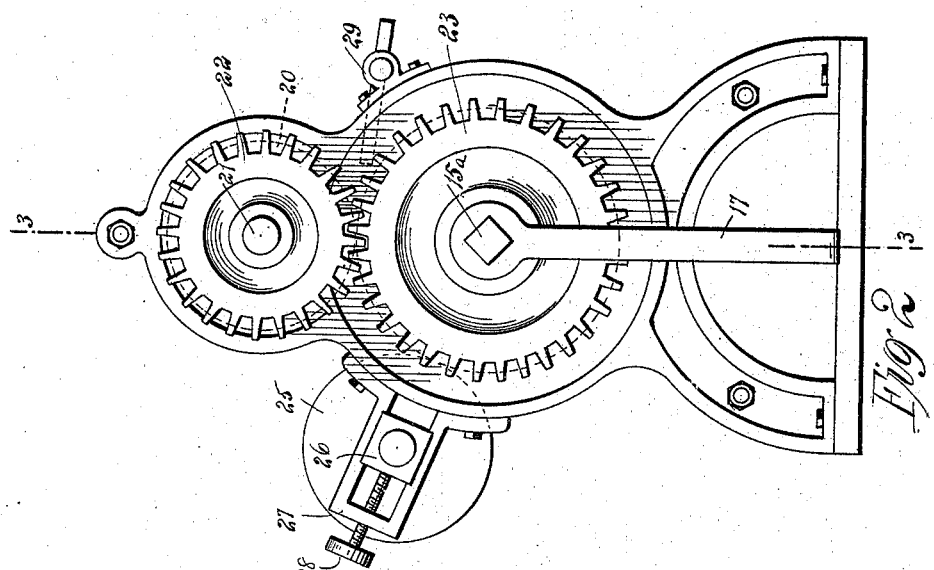
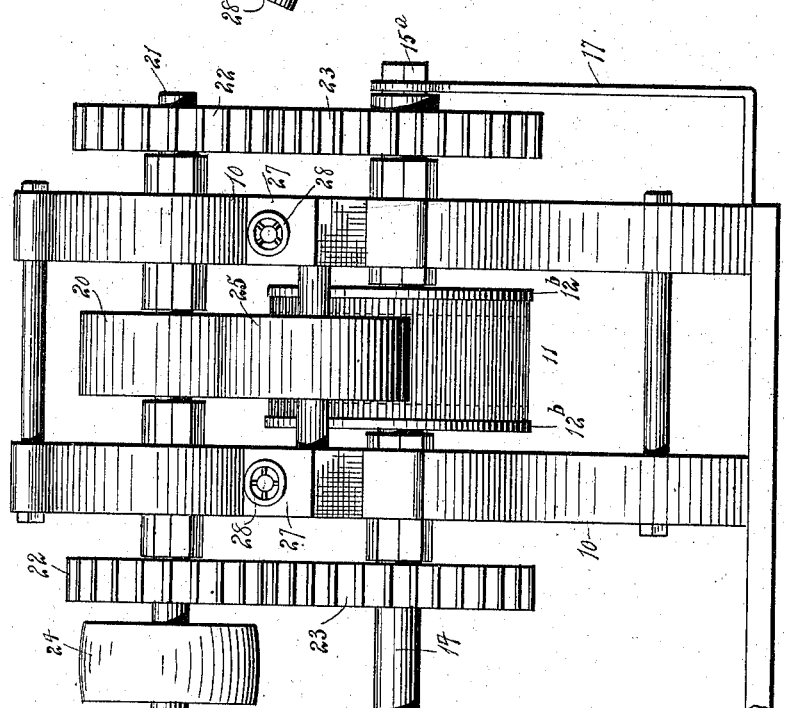
WITNESSES:
Bertram H. Saunders
Henry E. Heuser
INVENTORS
Milton T. Weston
George H. Marston
BY
W. P. Hutchinson
ATTORNEY.

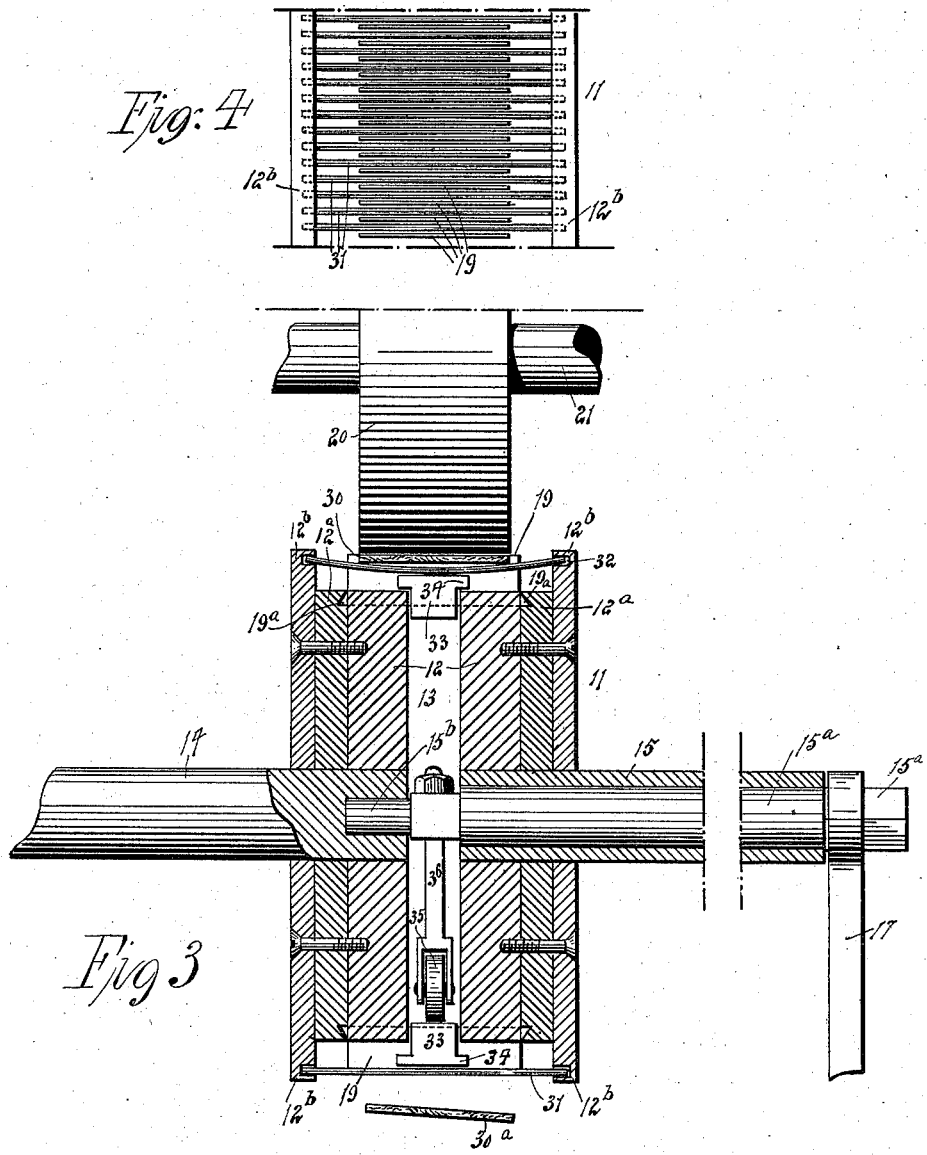

UNITED STATES PATENT OFFICE.

MILTON T. WESTON, OF NEW YORK, N. Y., AND GEORGE H. MARSTON, OF PASSAIC, NEW JERSEY.

SPLINT-CUTTING MACHINE.

SPECIFICATION forming part of Letters Patent No. 574,050, dated December 29, 1896.

Application filed April 27, 1896. Serial No. 589,170. (No model.)

*To all whom it may concern:*

Be it known that we, MILTON T. WESTON, of New York, in the county and State of New York, and GEORGE H. MARSTON, of Passaic, in the county of Passaic and State of New Jersey, have invented certain new and useful Improvements in Splint-Cutting Machines, of which the following is a full, clear, and exact description.

Our invention relates to improvements in that class of rotary cutting-machines which is adapted to cut strips of veneer into match-splints, tooth-picks, and other articles.

The object of our invention is to produce a machine of this character which is of simple construction, which works very rapidly, and especially to provide a system of ejecting which will quickly throw material from between the knives of the cutting drum or head and work without getting out of order; also, to construct the cutting drum or head in such a way that the knives and ejecting mechanism can be inserted or removed without difficulty.

Still another object of our invention is to arrange the spring-ejectors in such a way that they are backed up or reinforced by other mechanism, which prevents the spring-ejectors from being broken.

With these ends in view our invention consists of certain features of construction and combinations of parts, which will be hereinafter described and claimed.

Reference is to be had to the accompanying drawings, forming a part of this specification, in which similar figures of reference indicate corresponding parts in all the views.

Figure 1 is a rear elevation of the machine embodying our invention. Fig. 2 is a side elevation of the machine. Fig. 3 is a broken vertical section on the line 3 3 of Fig. 2; and Fig. 4 is a broken detail plan view of the cutting drum or head, showing the arrangement of the knives and ejecting-springs.

The machine has a suitable frame 10, on which is hung a rotary drum 11, formed of two similar end portions, each comprising the parts 12, $12^a$, and $12^b$, as shown in Fig. 3, which parts are screwed or otherwise fastened together, and the space 13 left between the two end portions of the drum affords room for the mechanism which reinforces the ejecting-springs, as hereinafter described. The two parts of the drum 11 are carried by shafts 14 and 15, which are journaled in the frame and supported at their outer ends on supporting-standards 16 and 17. The shaft 15 is hollow and turns on a stationary shaft $15^a$, the outer end of which is squared and held in the above-mentioned standard 17, while the inner end $15^b$ is journaled in the shaft 14, as shown in Fig. 3, and this connection serves to steady the connected shafts. The parts 12 and $12^a$ of the drum ends have faces flush with each other, which faces form the face of the drum, and the part $12^b$ is of greater diameter than the parts 12 and $12^a$, thus forming flanges in which the ejecting-springs are held, as hereinafter described.

The knives 19 are held in the parts 12 of the drum, the ends of the knives being widened slightly, as shown at $19^a$, so as to fit in corresponding recesses in the parts $12^a$ of the drum ends, and thus the knives are clamped firmly in place, and the arrangement described brings the edges of the knives about level with the outer edges of the flanges $12^b$ and with the ejecting-springs hereinafter referred to.

The knives 19 turn in close contact with a bearing drum or roller 20, which is held, preferably, above the drum 11 and is carried by a shaft 21, which is journaled on the frame 10, and the shaft 21 connects with the shafts 14 and 15 by gears 22 and 23. This arrangement causes both ends of the drum 11 to turn in unison without straining the knives and springs which connect the two ends of the drum. The shaft 21 also carries a driving-pulley 24, although it may be driven in any convenient way.

Following the drum 20 and bearing upon the knives 19 is a chasing-roll 25, which is preferably of rawhide and which causes the material between the knives to be cleanly cut if it should have passed by the drum 20 without being properly cut. The chasing-roll 25 is mounted in adjustable bearings 26, which move in slideways 27 and are controlled by the screws 28, this arrangement enabling the chasing-roll to be brought into close contact with the knives 19 of the cutting drum or head. This adjusting arrangement is common and nothing new is claimed for it.

The material 30 (see Fig. 3) to be cut is fed between the cutting drum or head 11 and the bearing-drum 20 in the usual manner, and the splints 30ª, which are cut between the knives, lie upon ejecting-springs 31, which extend parallel with each other across the face of the drum 11, there being an ejecting-spring between each pair of knives, and the ends of the springs are held in sockets 32 of the drum ends 12.

Ejecting-springs between the knives are not broadly new, such being shown in the patent to Hutchinson, No. 404,282, dated May 28, 1889, but springs in themselves are hardly strong enough to eject the material from the knives. Hence we employ auxiliary ejecting mechanism comprising in part the abutment-blocks 33, which are held in the spaces 13 of the drum 11, each block having a widened outer portion 34, which lies on the face of the drum. The outer ends of the abutment-blocks 33 contact with the springs 31 when the latter are bent inward in the center, as shown in the bottom part of Fig. 3, and the inner ends of the blocks 33 turn in contact with an abutment 35, which in the present instance is a roller journaled on the outer end of the arm 36, which is held rigidly to the shaft 15ª. The abutment 35 is arranged at the point where the ejecting of the splints 30ª is to take place.

As the cutting-drum 11 and bearing-drum 20 revolve the material 30, which is fed between the two drums, is cut into splints 30ª, which lie upon the ejecting-springs 31, and bend the springs inward, and when the abutment-blocks 33 are brought by the revolution of the cutting-drum in contact with the fixed abutment 35 the latter pushes the blocks 33 outward, as shown at the bottom of Fig. 3, and this action straightens out the springs 31 and pushes the splints 30 from between the knives where they may be caught by any suitable device arranged to receive them. It will be noticed that this arrangement causes the springs 31 to act with very little strain, and it will be seen that in case of any accident to either springs or knives the flanges 12ᵇ and parts 12ª can be loosened and the broken knives or springs removed and new ones substituted for them.

Having thus described our invention, we claim as new and desire to secure by Letters Patent—

1. A splint-cutting machine, comprising a rotatory cutting drum or head having radial knives, ejecting-springs held between the knives, a reinforcing device behind the springs to stiffen and assist the springs, and a bearing for the knife-edges, substantially as described.

2. A splint-cutting machine, comprising a rotatory cutting drum or head having radial knives, ejecting-springs held between the knives, a bearing opposite the knife-edges, and radially-movable reinforcing devices held behind the springs and adapted to contact with them, substantially as described.

3. A splint-cutting machine, comprising a rotatory cutting drum or head having radial knives, a bearing for the knife-edges, and ejecting-springs held between the knives, the said springs being supported at their ends only, whereby material cut by the knives will push in the central part of the springs, substantially as described.

4. A splint-cutting machine, comprising a rotatory cutting drum or head having radial knives, a bearing opposite the knife-edges, ejecting-springs held between the knives, and outwardly-moving abutment-blocks held behind the springs to engage and push out the latter, substantially as described.

5. A splint-cutting machine, comprising a rotatory cutting drum or head having radial knives, the said drum being formed of two separated end portions, a bearing opposite the knife-edges, ejecting-springs held between the knives, and outwardly-movable abutment-blocks held between the end parts of the drum and adapted to press against the springs during a part of the revolution of the drum, substantially as described.

6. A splint-cutting machine, comprising a rotary drum formed of separable end portions, radial knives held on the face of the drum and spanning the space between the end portions, ejecting-springs held between the knives, abutment-blocks held between the knives behind the springs and entering between the end portions of the drum, and a fixed abutment held between the drum ends to engage the abutment-blocks, substantially as described.

7. A splint-cutting machine, comprising a rotatory cutting drum or head formed of separated end portions and provided with radial knives, a bearing for the knife-edges, a stationary shaft entering the drum, ejecting-springs held between the knives of the drum, abutment-blocks arranged behind the springs and between the knives, and a fixed abutment supported on the stationary shaft and extending outward into contact with the abutment-blocks, substantially as described.

8. A splint-cutting machine, comprising a rotatory cutting drum or head formed of separable end portions, radial knives on the drum, a bearing for the edges of the knives, outwardly-movable abutment-blocks between the knives, and a stationary abutment held between the drum ends to engage and push out the abutment-blocks, substantially as described.

9. In a splint-cutting machine, the cutter-head comprising two similar end portions separated from each other, each having the separable parts 12, 12ª and 12ᵇ, as specified, the radial knives 19 held in the parts 12 and $12^a$, and the ejecting-springs held in the parts $12^b$ and extending between the knives, substantially as described.

10. In a splint-cutting machine, the cutter-head comprising the two end portions, each formed of the separable parts 12, $12^a$ and $12^b$, as specified, the knives held rigidly on the drum and clamped in the parts 12 and $12^a$ as shown, and mechanism for ejecting material from between the knives, substantially as described.

MILTON T. WESTON.
GEORGE H. MARSTON.

Witnesses:
W. B. HUTCHINSON,
BERTHA DEYO.